(12) United States Patent
Matsukawa et al.

(10) Patent No.: US 7,773,297 B2
(45) Date of Patent: Aug. 10, 2010

(54) SCANNING MICROSCOPE AND ADJUSTING METHOD FOR THE SAME

(75) Inventors: Yasunari Matsukawa, Saitama (JP); Masaharu Tomioka, Hino (JP); Akinori Araya, Yokohama (JP); Toshiyuki Hattori, Hachioji (JP)

(73) Assignee: Olympus Corporation, Tokyo (JP)

( * ) Notice: Subject to any disclaimer, the term of this patent is extended or adjusted under 35 U.S.C. 154(b) by 312 days.

(21) Appl. No.: 12/079,153

(22) Filed: Mar. 25, 2008

(65) Prior Publication Data

US 2008/0259442 A1    Oct. 23, 2008

(30) Foreign Application Priority Data

Mar. 28, 2007    (JP)    ............................. 2007-084730

(51) Int. Cl.
 *G02B 21/06*    (2006.01)
(52) U.S. Cl. ........................................ 359/380; 359/385
(58) Field of Classification Search ................. 359/368, 359/379–381, 385, 388, 389
See application file for complete search history.

(56) References Cited

U.S. PATENT DOCUMENTS

| | | | | |
|---|---|---|---|---|
| 4,661,692 A | * | 4/1987 | Kawasaki | 250/201.2 |
| 4,935,612 A | * | 6/1990 | Bierleutgeb | 250/201.2 |
| 5,276,550 A | | 1/1994 | Kojima | |
| 5,703,714 A | * | 12/1997 | Kojima | 359/368 |
| 6,754,003 B2 | * | 6/2004 | Engelhardt | 359/389 |
| 7,369,305 B2 | * | 5/2008 | Wolleschensky et al. | 359/380 |
| 2002/0158966 A1 | | 10/2002 | Olschewski et al. | |
| 2004/0109169 A1 | | 6/2004 | Olschewski | |
| 2005/0280818 A1 | | 12/2005 | Yamashita et al. | |
| 2007/0268574 A1 | * | 11/2007 | Sasaki | 359/385 |
| 2008/0204865 A1 | * | 8/2008 | Yoneyama et al. | 359/381 |
| 2009/0073554 A1 | * | 3/2009 | Nagasawa et al. | 359/385 |

FOREIGN PATENT DOCUMENTS

| | | |
|---|---|---|
| DE | 10235656 A1 | 2/2004 |
| EP | 0453239 A1 | 10/1991 |
| EP | 1235049 A2 | 8/2002 |
| JP | 2002-174779 A | 6/2002 |

OTHER PUBLICATIONS

An Extended European Search Report dated Aug. 8, 2008, issued in a counterpart European Application.

* cited by examiner

*Primary Examiner*—Alessandro Amari
*Assistant Examiner*—Mark Consilvio
(74) *Attorney, Agent, or Firm*—Frishauf, Holtz, Goodman & Chick, P.C.

(57) ABSTRACT

A scanning microscope includes an objective lens for focusing illumination light onto a specimen; a scanning device for deflecting and scanning the illumination light; a pupil-projection optical system for illuminating a pupil of the objective lens with the scanned illumination light; and a total-magnification specifying unit for specifying a total magnification. An optical-system selecting unit changes at least one of the objective lens and the pupil-projection optical system such that a magnification of an optical system including the objective lens and the pupil-projection optical system is equal to or less than the total magnification specified by the total-magnification specifying unit and that the numerical aperture of the optical system is maximized. A deflection-angle determination unit determines a deflection angle of the illumination light deflected by the scanning device based on the ratio of the magnification of the optical system to the total magnification to achieve the total magnification.

9 Claims, 4 Drawing Sheets

SCANNING MICROSCOPE AND ADJUSTING METHOD FOR THE SAME

BACKGROUND OF THE INVENTION

1. Field of the Invention

The present invention relates to scanning microscopes and to an adjusting method for the same.

This application is based on Japanese Patent Application No. 2007-084730, the content of which is incorporated herein by reference.

2. Description of Related Art

With a conventional scanning microscope, it is necessary to determine a magnification of an objective lens and a deflection angle of illumination light deflected by a galvanometer scanner as parameters for determining a field of view, that is, an observation range on a specimen.

However, multiple combinations of the magnification of the objective lens and the deflection angle of the galvanometer scanner result in the same field of view. Accordingly, there is a drawback in that it may not be possible to perform observation under the optimum conditions when the user is allowed to determine the combination of the magnification of the objective lens and the deflection angle of the galvanometer scanner.

Among microscope apparatuses for forming an image on a CCD using an objective lens and a zooming optical system, a microscope which determines a zoom magnification on the basis of the magnification of an objective lens, the numerical aperture, and the resolution of a CCD has been disclosed (for example, see Japanese Unexamined Patent Application, Publication No. 2002-174779).

BRIEF SUMMARY OF THE INVENTION

However, because the microscope disclosed in Japanese Unexamined Patent Application, Publication No. 2002-174779 is not a scanning microscope, this technique cannot be directly applied to a scanning microscope in which there is no limitation on the resolution in the photoelectric conversion process.

The present invention provides a scanning microscope that can be easily and optimally adjusted by eliminating a user operation that requires him/her to understand the relationship between, on the one hand, the magnification of an objective lens and the deflection angle of illumination light deflected by scanning device, and on the other hand, the total magnification on the basis of the magnification of the objective lens and the deflection angle of the illumination light deflected by the scanning device. The present invention further provides an adjusting method for the same.

A first aspect of the present invention is a scanning microscope comprising an objective lens configured to focus illumination light onto a specimen; scanning device for deflecting and scanning the illumination light; a pupil-projection optical system configured to illuminate a pupil of the objective lens with the illumination light scanned by the scanning device; a total-magnification specifying unit configured to specify a total magnification, an optical-system selecting unit configured to change at least one of the objective lens and the pupil-projection optical system in such a manner that a magnification of an optical system including the objective lens and the pupil-projection optical system is equal to or less than the total magnification specified by the total-magnification specifying unit and that the numerical aperture of the optical system is maximized; and a deflection-angle determination unit configured to determine a deflection angle of the illumination light deflected by the scanning device on the basis of the ratio of the magnification of the optical system to the total magnification so as to achieve the total magnification.

According to the first aspect of the present invention, by specifying the total magnification using the total-magnification specifying unit, at least one of the objective lens and the pupil-projection optical system is changed, by operating the optical-system selecting unit, in such a manner that the magnification thereof is equal to or less than the total magnification and that the numerical aperture of the optical system is maximized, and the deflection angle of the illumination light deflected by the scanning device is determined, by operating the deflection-angle determination unit, on the basis of the ratio of the magnification of the optical system to the total magnification. Accordingly, the setting is made to achieve the specified total magnification and to obtain the highest resolution. As a result, easy and optimum adjustment can be made by eliminating the user operation that requires detailed knowledge.

In the first aspect of the present invention described above, a plurality of the objective lenses may be provided in a selectable manner; the pupil-projection optical system may have a fixed pupil-projection magnification; the optical-system selecting unit may select, from among the plurality of objective lenses, an objective lens having a magnification equal to or less than the total magnification and having the maximum numerical aperture; and the deflection-angle determination unit may determine the deflection angle of the illumination light on the basis of the ratio of the magnification of the objective lens selected by the optical-system selecting unit to the total magnification.

By employing such a structure, the objective lens having the magnification equal to or less than the total magnification and having the maximum numerical aperture is selected by operating the optical-system selecting unit, and the deflection angle is determined on the basis of the ratio of the magnification of the objective lens to the total magnification by operating the deflection-angle determination unit. Accordingly, the setting can be made to achieve the specified total magnification and to obtain the highest resolution.

In the first aspect of the present invention described above, the pupil-projection optical system may have a variable pupil-projection magnification; the optical-system selecting unit may vary the pupil-projection magnification in such a manner that the magnification of the optical system is equal to or less than the total magnification and that the numerical aperture of the optical system is maximized; the deflection-angle determination unit may determine the deflection angle of the illumination light on the basis of the ratio of the magnification of the optical system to the total magnification.

By employing such a structure, the pupil-projection magnification of the pupil-projection optical system having the magnification equal to or less than the total magnification and having the maximum numerical aperture is selected by operating the optical-system selecting unit, and the deflection angle is determined, by operating the deflection-angle determination unit, on the basis of the ratio of the magnification of the optical system to the total magnification. Accordingly, the setting can be made to achieve the specified total magnification and to obtain the highest resolution.

In the first aspect of the present invention described above, the optical-system selecting unit may have a zooming mechanism configured to gradually vary the pupil-projection magnification of the pupil-projection optical system.

By employing such a structure, the optimum pupil-projection magnification is selected by gradually varying the pupil-projection magnification of the pupil-projection optical system by operating the zooming mechanism, and then the deflection angle of the scanning device is determined. Accordingly, it is possible to set the optimum value of the deflection angle that can achieve the specified total magnification and obtain the highest resolution.

In the first aspect of the present invention described above, a plurality of the pupil-projection optical systems may be provided in a selectable manner, and the optical-system selecting unit may select one pupil-projection optical system from among the plurality of pupil-projection optical systems.

By employing such a structure, the pupil-projection optical system is changed in a discontinuous manner, and the optimum deflection angle for the selected pupil-projection magnification is selected, thus achieving the specified total magnification and obtaining the highest resolution.

In the first aspect of the present invention described above, the total-magnification specifying unit may include a field-of-view specifying unit configured to specify a field of view to be observed using a value indicating the size thereof in an object plane and may convert the total magnification based on the field of view specified by the field-of-view specifying unit.

By employing such a structure, it is possible to achieve the specified total magnification and to obtain the highest resolution by the user merely specifying the size of the desired field of view, thus further improving user friendliness.

A second aspect of the present invention is an adjusting method for a scanning microscope including an objective lens configured to focus illumination light onto a specimen, scanning device for deflecting and scanning the illumination light, and a pupil-projection optical system configured to illuminate a pupil of the objective lens with the illumination light scanned by the scanning device, the adjusting method for the scanning microscope including specifying a total magnification; changing at least one of the objective lens and the pupil-projection optical system in such a manner that a magnification of an optical system including the objective lens and the pupil-projection optical system is equal to or less than the total magnification specified and that a numerical aperture of the optical system is maximized; and determining a deflection angle of the illumination light deflected by the scanning device on the basis of the ratio of the magnification of the optical system to the total magnification so as to achieve the total magnification.

According to the second aspect of the present invention, when specifying the total magnification, at least one of the objective lens and the pupil-projection optical system is changed in such a manner that the magnification of the optical system is equal to or less than the total magnification and that the numerical aperture is maximized, and the deflection angle of the illumination light deflected by the scanning device is determined on the basis of the ratio of the magnification of the optical system to the total magnification. Accordingly, settings can be made to achieve the specified total magnification and to obtain the highest resolution. As a result, easy and optimum adjustment can be achieved by eliminating user operations that require detailed knowledge.

In the second aspect of the present invention described above, in which the scanning microscope may include a plurality of the objective lenses in a selectable manner and the pupil-projection optical system may have a fixed pupil-projection magnification, the adjusting method for the scanning microscope may further comprise selecting, from among the plurality of objective lenses, an objective lens having a magnification that is equal to or less than the total magnification and having the maximum numerical aperture; and determining the deflection angle of the illumination light on the basis of the ratio of the magnification of the selected objective lens to the total magnification.

With this configuration, the objective lens having the magnification equal to or less than the total magnification and having the maximum numerical aperture is selected, and the deflection angle is determined on the basis of the ratio of the magnification of the objective lens to the total magnification. Accordingly, the scanning microscope is adjusted so as to achieve the specified total magnification and to obtain the highest resolution.

In the second aspect of the present invention described above, in which the pupil-projection optical system may have a variable pupil-projection magnification, the adjusting method for the scanning microscope may further comprise varying the pupil-projection magnification in such a manner that the magnification of the optical system is equal to or less than the total magnification and that the numerical aperture of the optical system is maximized; and determining the deflection angle of the illumination light on the basis of the ratio of the magnification of the optical system to the total magnification.

With this configuration, the pupil-projection magnification of the pupil-projection optical system having the magnification equal to or less than the total magnification and having the maximum numerical aperture is selected, and the deflection angle is determined on the basis of the ratio of the magnification of the optical system to the total magnification. Accordingly, the scanning microscope is adjusted so as to achieve the specified total magnification and to obtain the highest resolution.

According to the present invention, an advantage is afforded in that easy and optimum adjustment can be made by eliminating user operations that requires him/her to understand the relationship between, on the one hand, the magnification of the objective lens and the deflection angle of the illumination light deflected by the scanning device, and on the other hand, the total magnification on the basis of the magnification of the objective lens and the deflection angle of the illumination light deflected by the scanning device.

DETAILED DESCRIPTION OF THE INVENTION

A scanning microscope 1 and an adjusting method thereof according to an embodiment of the present invention will be described below with reference to FIGS. 1 and 2.

Figure 1:
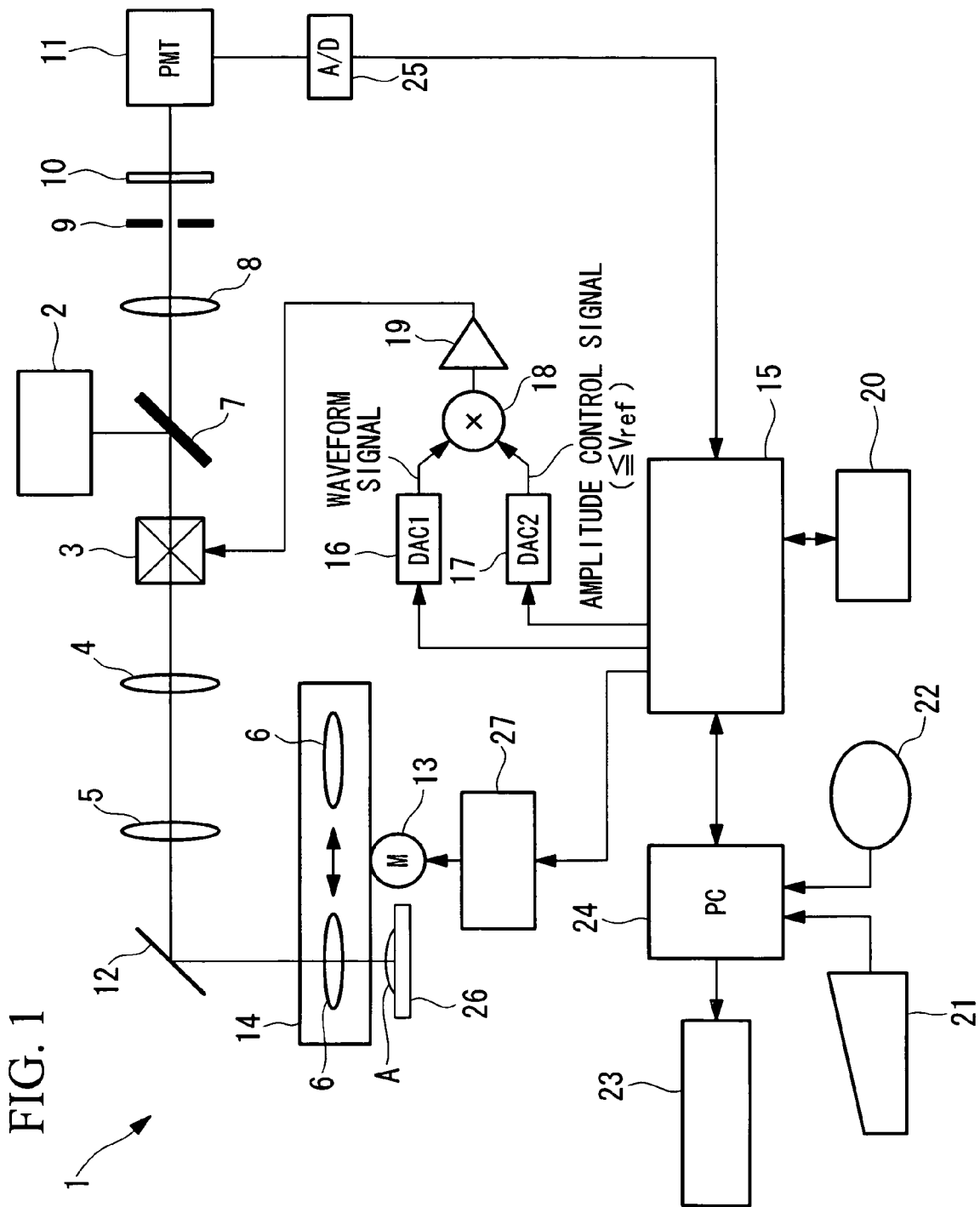
FIG. 1 is a diagram showing the overall configuration of a scanning microscope according to a first embodiment of the present invention.

As shown in FIG. 1, the scanning microscope 1 according to this embodiment includes a laser light source 2 for emitting laser light, a galvanometer scanner 3 for two-dimensionally scanning the laser light from the laser light source 2, a pupil-projection lens 4 and an image-forming lens 5 for focusing the laser light scanned by the galvanometer scanner 3 and for relaying a pupil formed at the galvanometer scanner 3, and an objective lens 6 for focusing the laser light, whose pupil is relayed by the pupil-projection lens 4 and the image-forming lens 5, onto a specimen A on a stage 26. The scanning microscope 1 also includes a dichroic mirror 7 for transmitting fluorescence, which is produced in the specimen A and which returns via the objective lens 6, the image-forming lens 5, the pupil-projection lens 4, and the galvanometer scanner 3, and for reflecting the laser light; a confocal lens 8 for focusing the fluorescence transmitted through the dichroic mirror 7; a confocal pinhole 9 disposed at a focal position of the confocal lens 8; a barrier filter 10 for blocking the laser light contained in the fluorescence; and a light detector 11 for detecting the fluorescence transmitted through the barrier filter 10. In the drawing, reference numeral 12 is a mirror.

An electric revolver 14, which is rotationally driven by a motor 13, is provided with a plurality of the objective lenses 6 having different magnifications and numerical apertures. In this way, by driving the electric revolver 14 with the motor 13, any one of the objective lenses 6 selected from among the plurality of objective lenses 6 provided in the electric revolver 14 is disposed on the optical axis. A control unit 15 is connected to the motor 13 via a motor driver 27. Accordingly, the motor driver 27 outputs a driving command to the motor 13 based on a command signal from the control unit 15 to rotationally drive the electric revolver 14, thus allowing any one of the objective lenses 6 to be selected.

Figure 2:
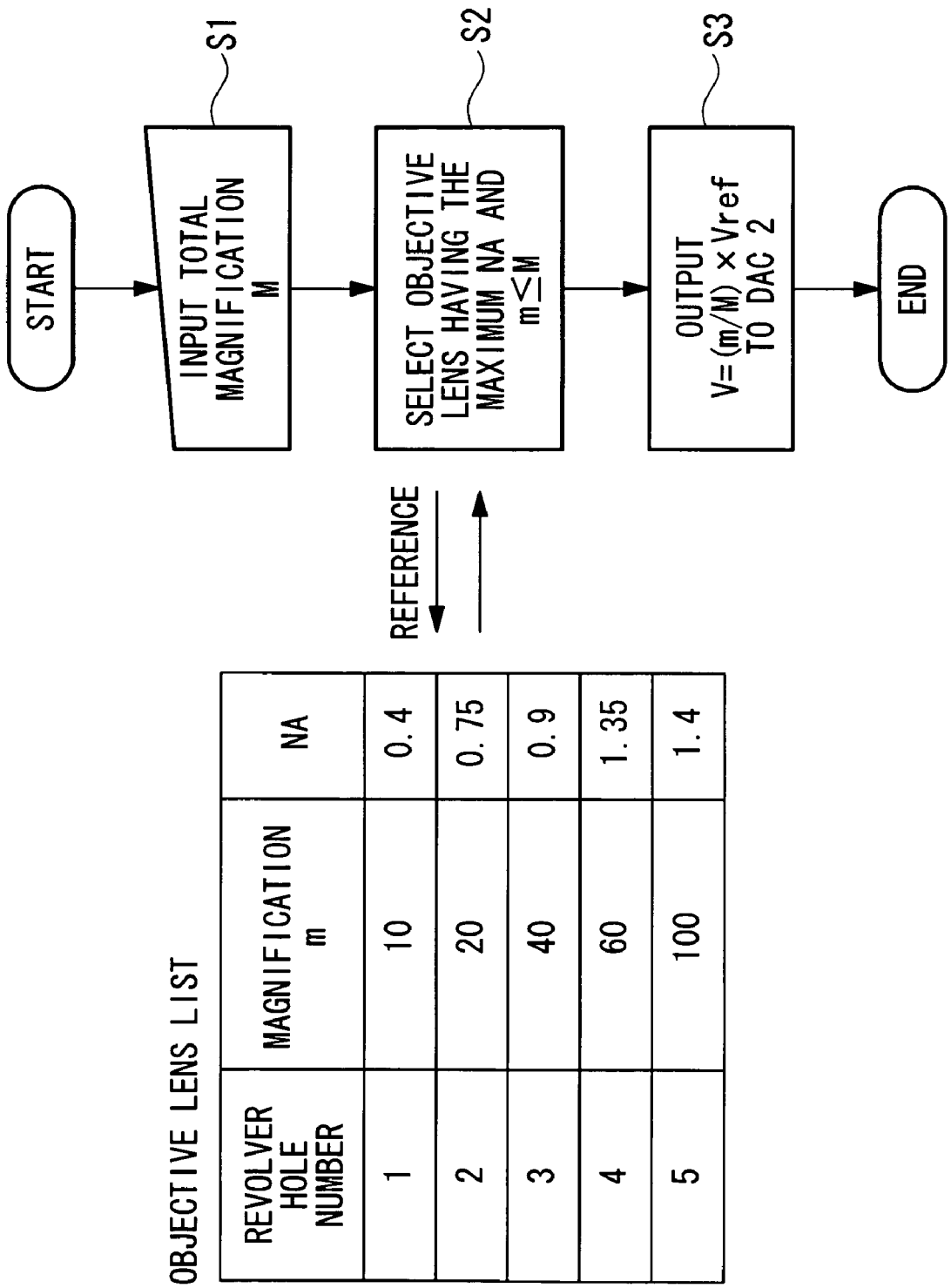
FIG. 2 shows an objective lens list and a flow chart for explaining an adjusting method of the scanning microscope in FIG. 1.

The control unit 15 stores, for example, an objective lens list, as shown in FIG. 2. The position (revolver hole number), magnification m, and numerical aperture of each of the objective lenses 6 in the electric revolver 14 are associated in the objective lens list.

The galvanometer scanner 3 is connected to the control unit 15 via a first D/A converter 16, a second D/A converter 17, a multiplier 18, and an amplifier 19.

The control unit 15 inputs a waveform signal, which is read out from a waveform memory 20 connected to the control unit 15, to the first D/A converter 16, and also inputs an amplitude control signal V, described later, to the second D/A converter 17. The outputs from these two D/A converters 16 and 17 are multiplied by the multiplier 18, amplified by the amplifier 19, and then input to the galvanometer scanner 3.

The waveform signal that is input to the first D/A converter 16 is a signal for determining oscillating patterns of each galvanometer mirror (not shown in the drawing) constituting the galvanometer scanner 3. The amplitude control signal V that is input to the second D/A converter 17 is a signal for determining a rocking angle of each galvanometer mirror constituting the galvanometer scanner 3, that is, a signal for determining a deflection angle range of the laser light deflected by the galvanometer mirror.

A computer 24 having a display 23 and input units, such as a keyboard 21, a mouse 22, etc., is connected to the control unit 15. A user can set the total magnification M using this computer 24.

The light detector 11 is, for example, a photomultiplier tube, and outputs luminance information of the fluorescence detected at each scanning position of the laser light scanned by the galvanometer scanner 3. The fluorescence luminance information which is output is converted to a digital value by an A/D converter 25 and then input to the control unit 15.

The control unit 15 associates the scanning position and the fluorescence luminance information obtained by the galvanometer scanner 3 and outputs them to the computer 24. The computer 24 generates one frame image when the scanning position and the fluorescence luminance information for one frame are input and outputs it to the display 23.

Now, an adjusting method of the scanning microscope 1 according to this embodiment will be described.

The user inputs a desired total magnification M as an observation condition using the input units 21 and 22 connected to the computer 24 (Step S1).

When the total magnification M (for example, M=50) is input, it is sent to the control unit 15. By referring to the objective lens list in the control unit 15, the objective lenses 6 having a magnification m equal to or less than the total magnification M (for example, revolver hole numbers 1, 2, and 3 shown in the objective lens list in FIG. 2) are selected. Among the selected objective lenses 6, the objective lens 6 having the maximum numerical aperture (for example, revolver hole number 3, magnification m=40, shown in the objective lens list in FIG. 2) is selected (Step S2).

Here, the amplitude control signal V, which is output to the galvanometer scanner 3, is calculated according to expression (1) below in the control unit 15 (Step S3).

$$V = (m/M) \times V_{ref} \tag{1}$$

Here, $V_{ref}$ is the reference value.

The gain of the amplifier 19 is adjusted in such a manner that the galvanometer scanner 3 scans the original field of view of the objective lens 6 when the reference value $V_{ref}$ is output.

In this example, when the reference value $V_{ref}$ is 5 V, the amplitude control signal V output from the control unit 15 is V=40/50×5=4 V.

The control unit 15 reads out the waveform signal from the waveform memory 20 and sequentially outputs it to the first D/A converter 16 in synchronization with a sampling clock.

The waveform signal output from the first D/A converter 16 and the amplitude control signal V output from the second D/A converter 17 are multiplied at the multiplier 18.

In other words, the output level of the amplitude control signal V from the multiplier 18 is $V/V_{ref}$ times larger than the output level in a case where the reference value $V_{ref}$ for scanning the original field of view of the objective lens 6 is output from the second D/A converter 17; therefore, the field of view scanned is $V/V_{ref}$ times narrower than the original field of view of the objective lens 6. This narrow field of view, however, can be imaged with the same number of pixels, and the magnification of the obtained image becomes $V_{ref}/V$ times compared to the original magnification m of the objective lens 6. As a result, the magnification of the obtained image is given by objective lens magnification m×galvanometer scanner magnification $V_{ref}/V$=total magnification M; therefore, the specified total magnification M can be obtained.

With the scanning microscope 1 and the adjusting method thereof according to this embodiment, having such a configuration, the user does not need to determine two separate parameters, i.e., selecting the magnification of the objective lens and the zooming by amplitude control of the galvanometer mirrors constituting the galvanometer scanner 3. Accordingly, the user can automatically perform the optimum setting simply by specifying the desired total magnification M that he or she eventually desires. In other words, with the scanning microscope 1 and the adjusting method thereof according to this embodiment, an advantage is afforded in that a high-resolution image can be easily obtained, because two parameters are selected in a combination that achieves the total magnification M and has the largest numerical aperture merely by specifying the desired total magnification M.

In this embodiment, the user inputs the total magnification M by operating the input units 21 and 22 of the computer 24. Instead of this, however, the user may specify the field of view to be observed using a value indicating the size thereof in an object plane. In this case, the total magnification M is converted from the specified amount at the computer 24. In this way, the user can specify the total magnification M in a more intuitive manner, thus improving operability.

Figure 3:
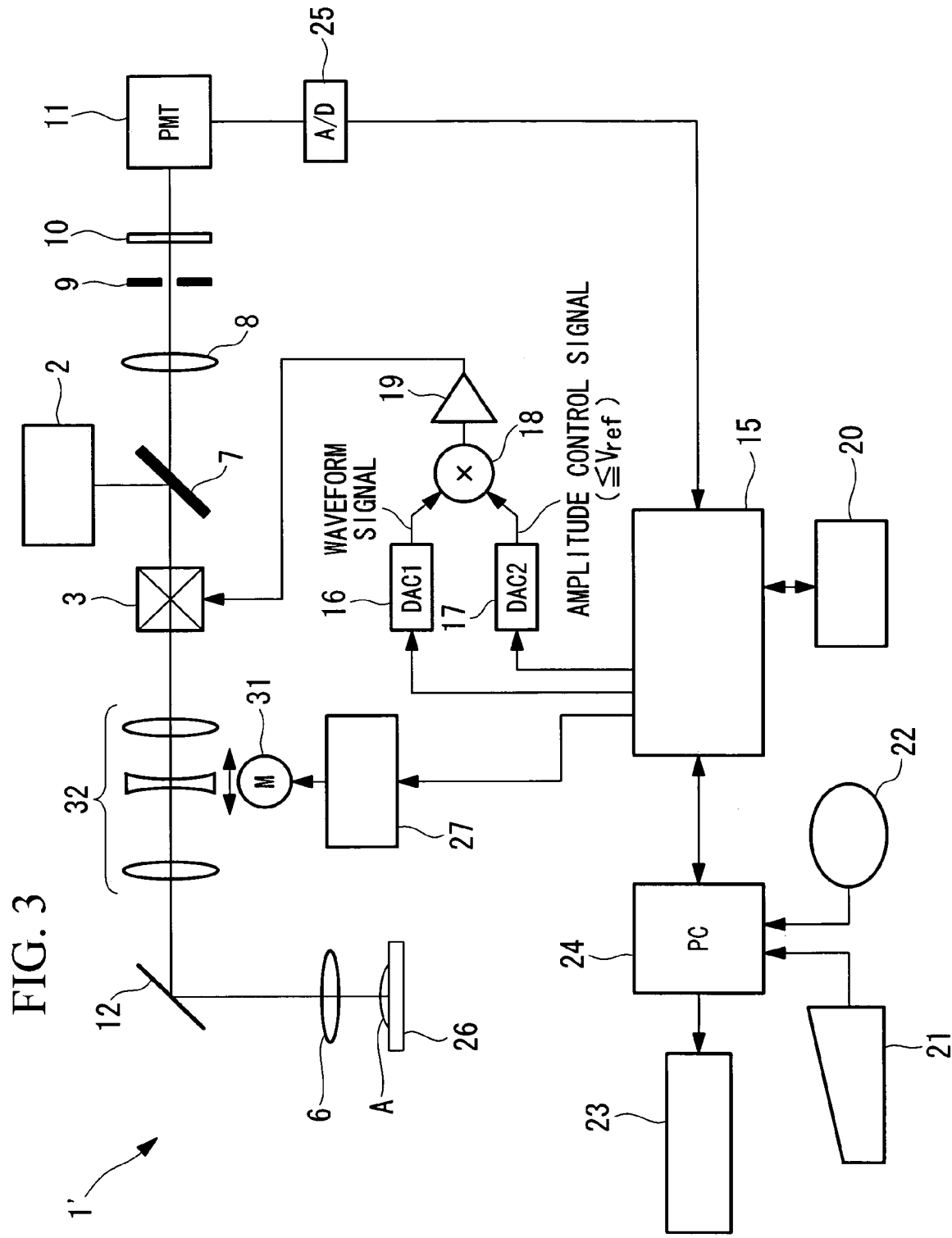
FIG. 3 is a diagram showing the overall configuration of a scanning microscope according to a second embodiment of the present invention.
Figure 4:
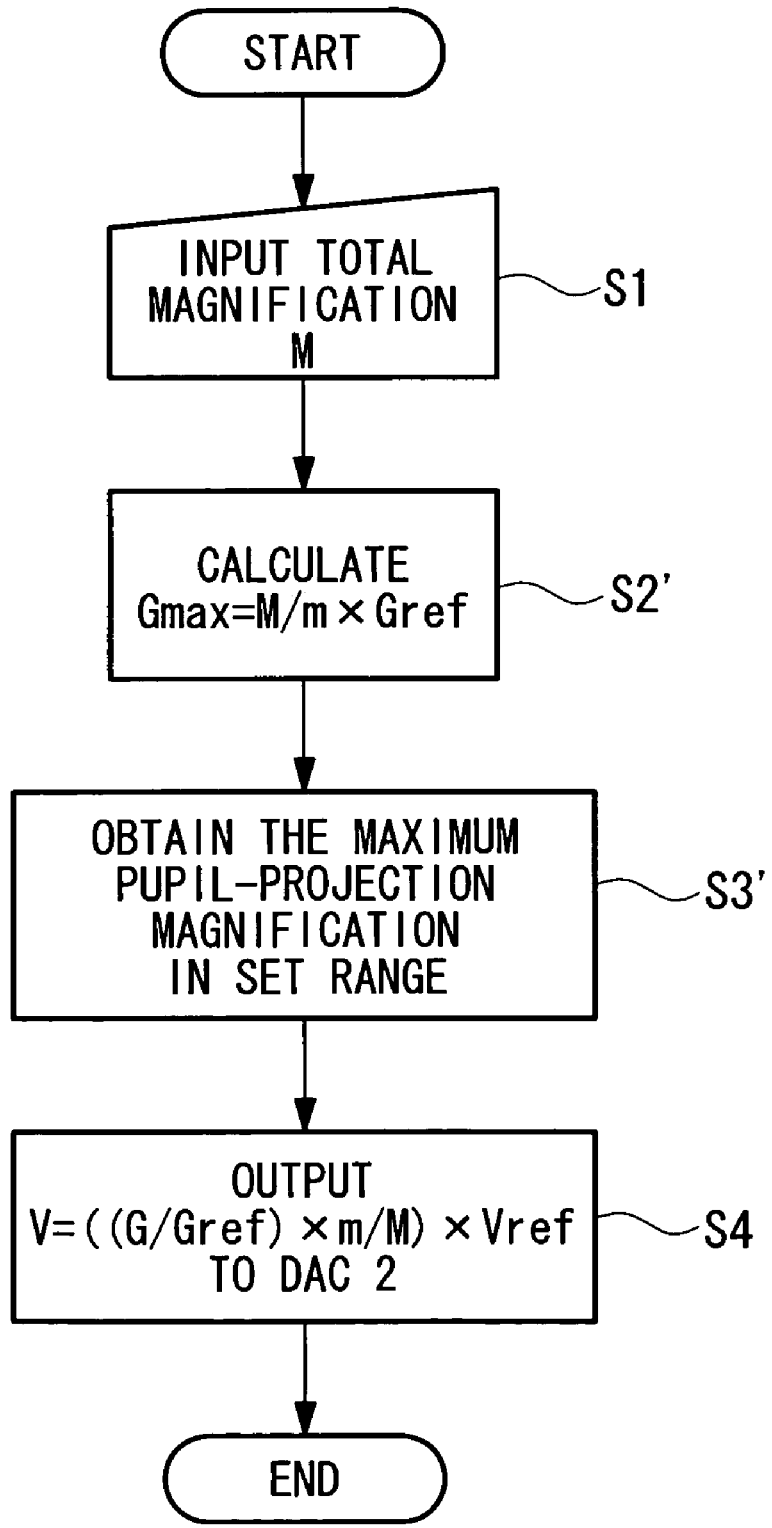
FIG. 4 is a flow chart for explaining an adjusting method of the scanning microscope in FIG. 3.

Next, a scanning microscope 1' and an adjusting method thereof according to a second embodiment of the present invention will be described with reference to FIGS. 3 and 4.

In the description of this embodiment, parts having the same configuration as those in the scanning microscope 1 according to the first embodiment described above are assigned the same reference numerals, and a description thereof will be omitted here.

With the scanning microscope 1 according to the first embodiment, the plurality of objective lenses 6 are changed, and a single pupil-projection lens 4 is provided. In contrast, the scanning microscope 1' according to this embodiment differs from the scanning microscope 1 according to the first embodiment in that it includes a single objective lens 6 and a power-zoom variable-magnification pupil-projection optical system 32 driven by a motor 31.

The variable range of the magnification of the pupil-projection optical system 32 can be set between a minimum magnification $G_{ref}$ (for example, $G_{ref}=4$) and a maximum magnification (for example, 8×) at which the laser light just fills the pupil of the objective lens 6.

The gain of the amplifier 19 is adjusted in such a manner that the original field of view of the objective lens 6 is scanned when the pupil-projection magnification G of the pupil-projection optical system 32 is the minimum magnification $G_{ref}$, and the amplitude control signal V of the second D/A converter 17 is the reference value $V_{ref}$.

Now, the adjustment method of the scanning microscope 1' according to this embodiment will be described.

The user inputs a desired total magnification M as an observation condition using the input units 21 and 22 connected to the computer 24 (Step S1).

When the total magnification M (for example, M=50) is input, it is sent to the control unit 15, where the magnification $G_{max}$ given by $G_{max}=M/m \times G_{ref}$ (for example, $G_{max}=50/10 \times 4=20$) is calculated by multiplying the ratio of the total magnification M to the magnification m (for example, m=10) of the objective lens 6 by the minimum magnification $G_{ref}$ (Step S2').

Then, the maximum pupil-projection magnification G is calculated within the range of the magnification $G_{max}$ (Step S3'). By setting the pupil-projection magnification G of the pupil-projection optical system 32 (in the example of this embodiment, it is 8× because the pupil-projection magnification is between 4× and 8×) by driving the motor 31, the field of view scanned is $G_{ref}/G$ times narrower than the original field of view of the objective lens 6.

Here, the amplitude control signal V output to the galvanometer scanner 3 is calculated according to expression (2) below in the control unit 15 (Step S4).

(2)

In this example, when the reference value $V_{ref}$ is 5 V, the amplitude control signal V output from the control unit 15 is given by $V=(8/4) \times (10/50) \times 5 = 2$ V.

The control unit 15 reads out the waveform signal from the waveform memory 20 and sequentially outputs it to the first D/A converter 16 in synchronization with the sampling clock.

The waveform signal output from the first D/A converter 16 and the amplitude control signal V output from the second D/A converter 17 are multiplied at the multiplier 18.

In other words, the output level of the amplitude control signal V from the multiplier 18 is $V/V_{ref}$ times larger than the output level in a case where the reference value $V_{ref}$ for scanning the original field of view of the objective lens 6 is output from the second D/A converter 17; therefore, the field of view scanned is $V/V_{ref}$ times more narrow than the original field of view of the objective lens 6. This narrow field of view, however, can be imaged with the same number of pixels, and the magnification of the obtained image becomes $(G/G_{ref}) \times (V_{ref}/V)$ times the original magnification m of the objective lens 6. As a result, the magnification of the obtained image is given by objective lens magnification $m \times (G/G_{ref}) \times (V_{ref}/V) =$ total magnification M; therefore, the specified total magnification M can be obtained.

With the scanning microscope 1' and the adjusting method thereof according to this embodiment, having such a configuration, the user can automatically set the pupil-projection optical system 32 and the amplitude of the galvanometer scanner 3 to optimum values simply by specifying the total magnification M that he or she eventually desires without being concerned about a change in the field of view due to a magnification change of the pupil-projection optical system 32, even when using a single objective lens 6 and changing the pupil-projection magnification G of the pupil-projection optical system 32 to cover a range from low magnification/numerical aperture to high magnification/numerical aperture.

With the scanning microscope 1' and the adjustment method thereof according to this embodiment, among the combinations that achieve the total magnification M, the combination including the maximum numerical aperture is selected merely by specifying the desired total magnification M. Therefore, with the scanning microscope 1' and the adjusting method thereof according to this embodiment, an advantage is afforded in that a high resolution image can easily be acquired.

In the above description, the total magnification M is 50, the objective magnification m is 10, the minimum pupil-projection magnification $G_{ref}$ is 4, and the magnification range of the pupil-projection optical system 32 is from 4× to 8×. Instead of these values, when, for example, the total magnification M is 15, the objective lens magnification m is 10, the minimum pupil-projection magnification $G_{ref}$ is 4, and the magnification range of the pupil-projection optical system 32 is from 4× to 8×, $G_{max}$ is given by $15/10 \times 4=6$. Because this is within the magnification range of the pupil-projection optical system 32, the total magnification M can be obtained merely by adjusting the pupil-projection optical system 32. Accordingly, the reference voltage $V_{ref}$ of 5 V should be output to the galvanometer scanner 3.

In this embodiment, a power-zoom optical system driven by the motor 31 has been described as an example of the pupil-projection optical system 32. However, it is not limited thereto; a plurality of selectively changeable pupil-thereof according to this embodiment, among the combinations that achieve the total magnification M, the combination including the maximum numerical aperture is selected merely by specifying the desired total magnification M. Therefore, with the scanning microscope 1' and the adjusting method thereof according to this embodiment, an advantage is afforded in that a high resolution image can easily be acquired.

In the above description, the total magnification M is 50, the objective magnification m is 10, the minimum pupil-projection magnification $G_{ref}$ is 4, and the magnification range of the pupil-projection optical system 32 is from 4× to 8×. Instead of these values, when, for example, the total magnification M is 15, the objective lens magnification m is 10, the minimum pupil-projection magnification $G_{ref}$ is 4, and the magnification range of the pupil-projection optical system 32 is from 4× to 8×, $G_{max}$ is given by $15/10 \times 4=6$. Because this is within the magnification range of the pupil-projection optical system 32, the total magnification M can be obtained merely by adjusting the pupil-projection optical system 32. Accordingly, the reference voltage $V_{ref}$ of 5 V should be output to the galvanometer scanner 3.

In this embodiment, a power-zoom optical system driven by the motor 31 has been described as an example of the pupil-projection optical system 32. However, it is not limited thereto; a plurality of selectively changeable pupil-projection optical system units (not shown in the drawing) having different pupil-projection magnifications G may be provided. In this case, the pupil-projection optical system units may be changed in any way, such as by using a turret, an insertable/removable mirror, etc.

What is claimed is:

1. A scanning microscope comprising:
   an objective lens configured to focus illumination light onto a specimen;
   scanning device for deflecting and scanning the illumination light;
   a pupil-projection optical system configured to illuminate a pupil of the objective lens with the illumination light scanned by the scanning device;
   a total-magnification specifying unit configured to specify a total magnification,
   an optical-system selecting unit configured to change at least one of the objective lens and the pupil-projection optical system in such a manner that a magnification of an optical system including the objective lens and the pupil-projection optical system is equal to or less than the total magnification specified by the total-magnification specifying unit and that the numerical aperture of the optical system is maximized; and
   a deflection-angle determination unit configured to determine a deflection angle of the illumination light deflected by the scanning device on the basis of the ratio of the magnification of the optical system to the total magnification so as to achieve the total magnification.

2. A scanning microscope according to claim 1, wherein
   a plurality of the objective lenses are provided in a selectable manner;
   the pupil-projection optical system has a fixed pupil-protection magnification;
   the optical-system selecting unit selects, from among the plurality of objective lenses, an objective lens having a magnification equal to or less than the total magnification and having the maximum numerical aperture; and
   the deflection-angle determination unit determines the deflection angle of the illumination light on the basis of the ratio of the magnification of the objective lens selected by the optical-system selecting unit to the total magnification.

3. A scanning microscope according to claim 1, wherein
   the pupil-projection optical system has a variable pupil-projection magnification;
   the optical-system selecting unit varies the pupil-projection magnification in such a manner that the magnification of the optical system is equal to or less than the total magnification and that the numerical aperture of the optical system is maximized;
   the deflection-angle determination unit determines the deflection angle of the illumination light on the basis of the ratio of the magnification of the optical system to the total magnification.

4. A scanning microscope according to claim 3, wherein the optical-system selecting unit has a zooming mechanism configured to gradually vary the pupil-projection magnification of the pupil-projection optical system.

5. A scanning microscope according to claim 3, wherein
   a plurality of the pupil-projection optical systems are provided in a selectable manner, and
   the optical-system selecting unit selects one pupil-projection optical system from among the plurality of pupil-projection optical systems.

6. A scanning microscope according to claim 1, wherein the total-magnification specifying unit includes a field-of-view specifying unit configured to specify a field of view to be observed using a value indicating the size thereof in an object plane and convert the total magnification based on the field of view specified by the field-of-view specifying unit.

7. An adjusting method for a scanning microscope including an objective lens configured to focus illumination light onto a specimen, scanning device for deflecting and scanning the illumination light, and a pupil-projection optical system configured to illuminate a pupil of the objective lens with the illumination light scanned by the scanning device, the adjusting method for the scanning microscope comprising:
   specifying a total magnification;
   changing at least one of the objective lens and the pupil-projection optical system in such a manner that a magnification of an optical system including the objective lens and the pupil-projection optical system is equal to or less than the total magnification specified and that a numerical aperture of the optical system is maximized; and
   determining a deflection angle of the illumination light deflected by the scanning device on the basis of the ratio of the magnification of the optical system to the total magnification so as to achieve the total magnification.

8. An adjusting method for a scanning microscope according to claim 7, wherein the scanning microscope includes a plurality of the objective lenses in a selectable manner and the pupil-projection optical system has a fixed pupil-projection magnification, the adjusting method for the scanning microscope further comprising:
   selecting, from among the plurality of objective lenses, an objective lens having a magnification that is equal to or less than the total magnification and having the maximum numerical aperture; and
   determining the deflection angle of the illumination light on the basis of the ratio of the magnification of the selected objective lens to the total magnification.

9. An adjusting method for a scanning microscope according to claim 7, wherein the pupil-projection optical system has a variable pupil-projection magnification, the adjusting method for the scanning microscope further comprising:
   varying the pupil-projection magnification in such a manner that the magnification of the optical system is equal to or less than the total magnification and that the numerical aperture of the optical system is maximized; and
   determining the deflection angle of the illumination light on the basis of the ratio of the magnification of the optical system to the total magnification.

* * * * *